United States Patent
Ryan

(10) Patent No.: US 9,839,223 B2
(45) Date of Patent: Dec. 12, 2017

(54) FISH PROCESSING SYSTEMS AND METHODS

(71) Applicant: Ryco Equipment, Inc., Mountlake Terrace, WA (US)

(72) Inventor: Robert M. Ryan, Woodway, WA (US)

(73) Assignee: Ryco Equipment, Inc., Mountlake Terrace, WA (US)

( * ) Notice: Subject to any disclaimer, the term of this patent is extended or adjusted under 35 U.S.C. 154(b) by 0 days.

(21) Appl. No.: 15/476,692

(22) Filed: Mar. 31, 2017

(65) Prior Publication Data

US 2017/0280735 A1 Oct. 5, 2017

Related U.S. Application Data

(60) Provisional application No. 62/316,255, filed on Mar. 31, 2016.

(51) Int. Cl.
| | |
|---|---|
| A22C 25/00 | (2006.01) |
| A22C 25/16 | (2006.01) |
| A22C 25/08 | (2006.01) |
| A22C 25/12 | (2006.01) |
| A22C 25/18 | (2006.01) |

(52) U.S. Cl.
CPC ............ *A22C 25/166* (2013.01); *A22C 25/08* (2013.01); *A22C 25/12* (2013.01); *A22C 25/163* (2013.01); *A22C 25/18* (2013.01)

(58) Field of Classification Search
CPC ..... A22C 25/00; A22C 25/142; A22C 25/145; A22C 25/147

USPC .......................................................... 452/135
See application file for complete search history.

(56) References Cited

U.S. PATENT DOCUMENTS

| | | | | |
|---|---|---|---|---|
| 4,037,294 A | * | 7/1977 | Cowie ................... | A22C 25/16 452/136 |
| 4,507,824 A | * | 4/1985 | Sawusch ................ | A22C 25/16 452/121 |
| 4,583,265 A | * | 4/1986 | Kristinsson ........... | A22C 25/14 452/155 |
| 5,226,848 A | * | 7/1993 | Sigurdsson ........... | A22C 25/14 452/108 |
| 5,413,525 A | * | 5/1995 | Braeger ................. | A22C 25/08 452/161 |
| 5,536,205 A | * | 7/1996 | Braeger ................. | A22C 25/16 452/136 |

(Continued)

*Primary Examiner* — Richard Price, Jr.
(74) *Attorney, Agent, or Firm* — Seed IP Law Group LLP

(57) ABSTRACT

Methods and systems for processing fish, such as salmon, are provided which enable filleting of the fish in a particular efficient manner. An example method includes exposing a backbone of a fish from a belly side of the fish, positioning the backbone of the fish on a conveyor device, and conveying the fish with the backbone in contact with the conveyor device. The conveyor may be a spiked chain, and positioning the backbone of the fish on the conveyor device may include engaging the backbone of the fish with the spiked chain such that the fish straddles the spiked chain as the fish is transported. The method may further include cutting the fish from the dorsal side on each of opposing sides of a central plane of the fish to a location adjacent a connection of the pinbones of the fish with the vertebrae of the fish while the fish is conveyed with the backbone in contact with the conveyor device, and subsequently peeling the ribs and ventral spines from fillets of the fish.

16 Claims, 10 Drawing Sheets

(56) References Cited

U.S. PATENT DOCUMENTS 5,980,376 A * 11/1999 Grosseholz .......... A22C 25/147
                                                                452/109

* cited by examiner

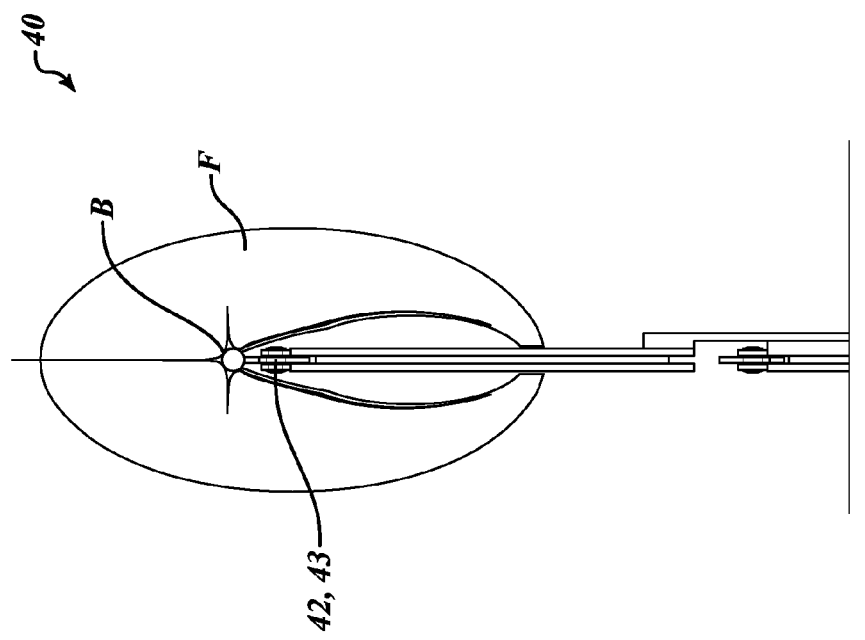

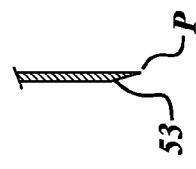
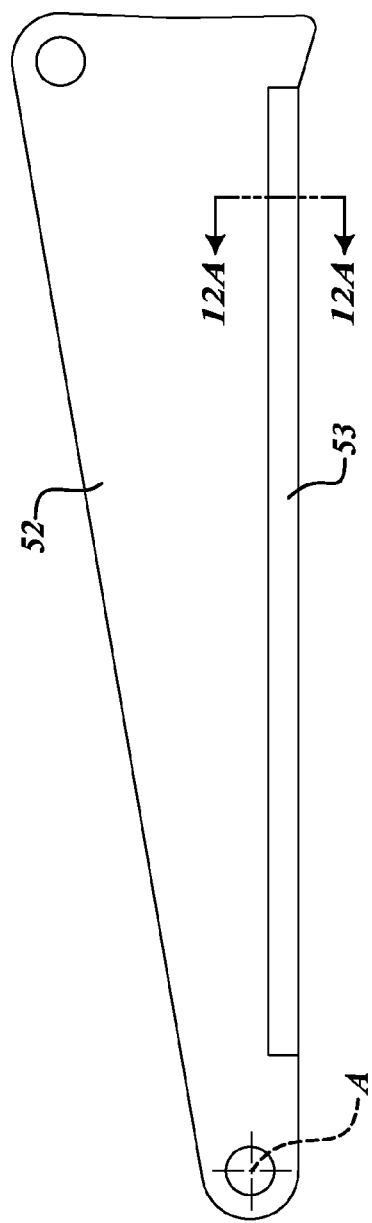
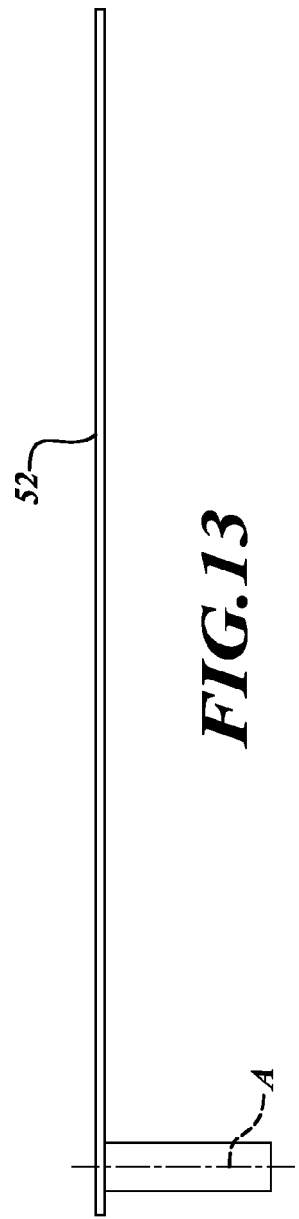

FISH PROCESSING SYSTEMS AND METHODS

BACKGROUND

Technical Field

This disclosure generally relates to systems and methods for processing fish, and more particularly to systems and methods for filleting fish and/or preparing fish for filleting.

Description of the Related Art

Machines for filleting fish, such as salmon, have been in use for many years. Usually fish, such as salmon, are filleted by machines after removing the head with the collar and pectoral fins, cutting open the belly, and removing the viscera. In some operations the tail and fins may also be removed before machine filleting, either to facilitate the filleting process or to reduce fillet trimming.

Example systems and methods for filleting fish are described in U.S. Pat. No. 3,309,730 to Michael, issued Mar. 21, 1967; U.S. Pat. No. 5,520,576 to Wastell et al., issued May 28, 1996; and U.S. Pat. No. 6,994,617 to Jakobsen et al., issued Feb. 7, 2006, the entire contents of which are incorporated herein by reference in their entireties.

By way of background, when filleting salmon, the salmon are usually processed according to the following method:
1. Removing the head and guts while leaving the collar on the fish to produce a head and gut product (H&G).
2. Sorting by quality and size.
3. Sorting by product type (H&G, canned or filleted).
4. Removing the collar and pectoral fins.
5. Removing the tail (in most but not all filleting processes)
6. Filleting by hand or by machine.
7. Trimming.
8. Removing pinbones.
9. Inspecting.
10. Packaging.

Some salmon are sold headed and gutted to the consumer; however, this is a declining market as most consumers are transitioning to "ready to eat" products.

Currently, salmon are headed and gutted in one operation, then packaged and shipped, or stored for further processing. To produce fillets, the backbone, ribs, dorsal and ventral spines must be removed from the muscle, producing two symmetrical fillets. Some fillets are produced and sold as PBI, or "Pin Bone In." Higher value fillets are PBO, or "Pin Bone Out." Fish sold as PBI may be filleted immediately after heading and gutting. If the pinbones must be removed, the fish generally must be aged for up to 24 hours after death to allow the pinbone attachment to the muscle to relax. The pinbones are fragile with limited tensile strength. In fresh fish they are tightly held by the muscles and in some species are also attached firmly to the skin. Pinbones may be removed manually with pliers or tweezers, or by machine. Regardless of the method, the fish must be aged before pinbone removal. It has proven impractical to store fillets before pinbone removal, so PBO fish are headed and gutted in one operation, stored for a period of time, then filleted and pinboned.

Mechanical salmon filleting generally requires the fish to be supported such that two cuts are made down from the top of the fish to the backbone, one on each side of the dorsal spines. Then two cuts are made from the bottom of the fish upward. The spine-ribs are often cut in the middle in most fillet machines, the upper part still attached to the vertebra, the lower part in the fillet. This process results in two identical fillets of mostly muscle tissue from each side of the fish and the central frame with the ribs and vertebrae. The tail, dorsal, anal and adipose fins can be removed manually prior to filleting, or they can be removed in the fillet machine with the frame.

While known systems and methods have been generally effective in filleting fish, such systems and related methods may suffer from various deficiencies, such as, for example, the failure to consistently remove the centerline fins and spine in the middle section of the fish. One particular difficulty with existing filleting machines is maintaining the fish positioned in the machine such that the vertebra column is parallel to fish travel, allowing the knives to cut accurately along the ribs and spines to their connection to the vertebra.

BRIEF SUMMARY

The systems and methods of processing fish described herein provide for the efficient and reliable filleting of fish, particularly salmon, and/or for preparing such fish for filleting. One example method may be summarized as exposing a backbone of a fish from a belly side of the fish, positioning the backbone of the fish on a conveyor device, and conveying the fish with the backbone in contact with the conveyor device. The conveyor may be a spiked chain, and positioning the backbone of the fish on the conveyor device may include engaging the backbone of the fish with the spiked chain such that the fish straddles the spiked chain as the fish is transported. The method may further include cutting the fish from the dorsal side on each of opposing sides of a central plane of the fish to a location adjacent a connection of the pinbones of the fish with the vertebrae of the fish while the fish is conveyed with the backbone in contact with the conveyor device, and subsequently peeling the ribs and ventral spines from fillets of the fish.

BRIEF DESCRIPTION OF THE SEVERAL VIEWS OF THE DRAWINGS

FIG. 8 is a cross-sectional view of the portion of the fish processing system of FIG. 7.

FIG. 12 is a side elevational view of a peeling member for one side of the portion of the fish processing system of FIG. 9, which is a mirror-image of a peeling member for the other side.

FIG. 12A is a cross-sectional detail view of a profile of an edge portion of the peeling member of FIG. 12.

FIG. 13 is a top plan view of the peeling member of FIG. 12.

DETAILED DESCRIPTION

Figure 1:
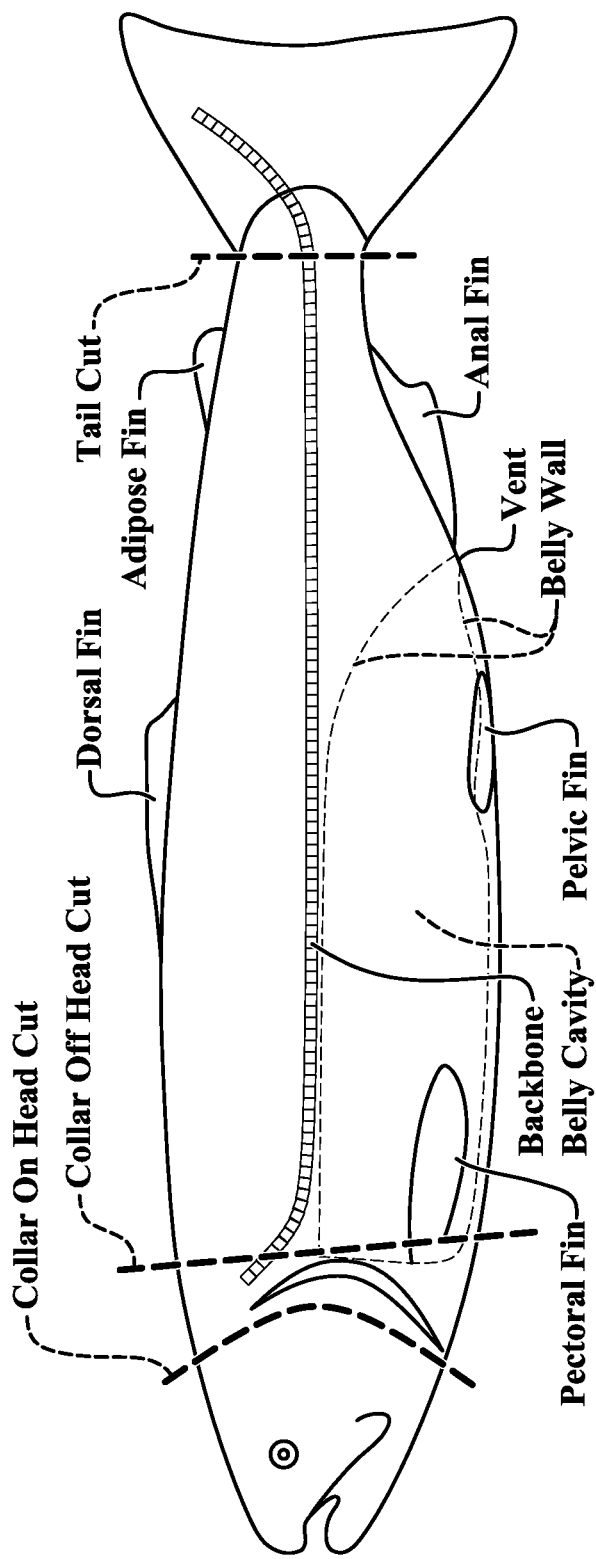
FIG. 1 is a side elevational view of a typical salmon, which illustrates various anatomical features that may be relevant to the fish processing systems and methods described herein.

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with fish processing systems and methods may not be shown or described in detail to avoid unnecessarily obscuring descriptions of the embodiments. For instance, well known conveying systems may be used to transport fish through the various fish processing systems and devices described herein, such as, for example, opposing conveyor belts which are pressed into contact with the fish by tensioning rollers disposed along a fish transport path. Drive and control systems may be provided with the conveyor systems to selectively control a speed with which the belts move and thus a rate at which fish are processed.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

With reference to FIGS. 1 and 2A-2C, an overview of salmon structure is provided to assist in describing the fish processing systems and methods described herein. All salmon have three different structures from head to tail:

1. Head Section, in which the backbone is exposed at the top of the belly cavity and ribs are exposed on both sides of the belly cavity.

2. Middle Section, in which the top of the belly cavity departs from the backbone and ends at the "vent". The ribs extend out from the vertebra, then curve back together and join briefly to form the hemal tunnel, and then separate to enclose the end of the belly cavity. These "spine-ribs" are a transition from the ribs in the Head Section to the Spines in the Tail Section. In this middle section, the vertebrae are not exposed in the belly cavity.

3. Tail Section, in which the spine is roughly centered in the body, with double spines projecting from the backbone both top and bottom, almost to the skin.

From head to tail, four fans of tendons connect the rolls of muscle to each vertebrae section, two sets of tendons on either side of the vertebrae, both dorsal and ventral. As the tendons approach the vertebral connection, they join into bundles, which become very stiff close to the vertebrae. These tendon bundles are referred to as "pinbones." The dorsal pinbones are too large for human consumption and must be removed, either by the processor or the consumer. The ventral pinbones are much smaller and more flexible and are seldom removed by processors, and often are consumed.

Figure 2C:
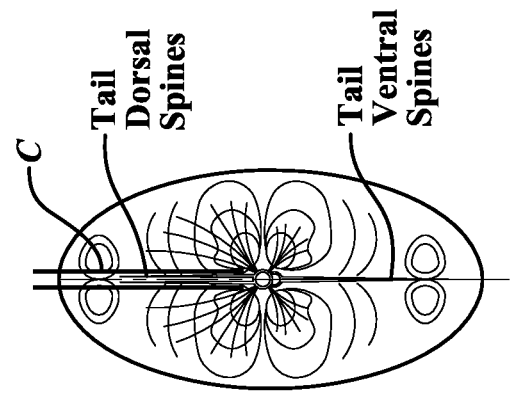
FIGS. 2A-2C are cross-sectional views of a typical salmon which illustrate various anatomical features that may be relevant to the fish processing systems and methods described herein.
Figure 2B:
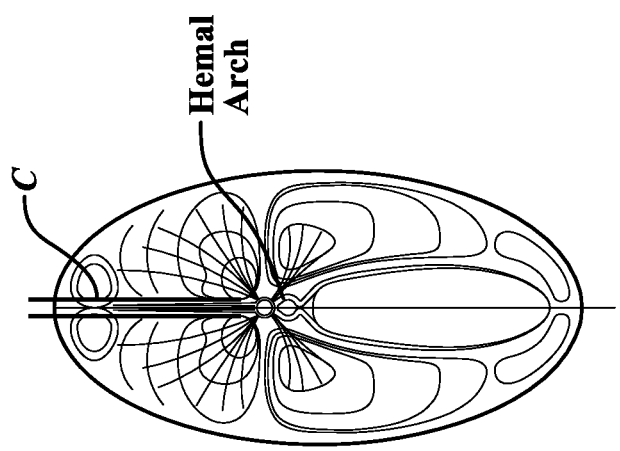
Figure 2A:
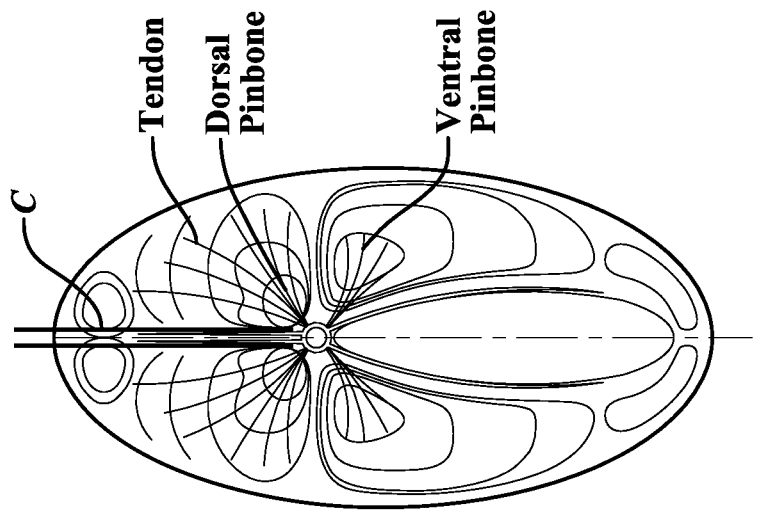

From the head to the tail, double dorsal spines project from the top of the backbone and extend almost to the top of the fish. From head to tail, double ventral spines project from the bottom of the backbone. In the Head Section these are called ribs, and enclose the belly cavity, as illustrated in FIG. 2A. In the Middle Section they enclose the hemal tunnel next to the vertebrae, and the lower ends enclose the end of the belly cavity, as illustrated in FIG. 2B. In the Tail Section, the ventral spines are joined from the hemal arch tunnel to their bottom ends, as illustrated in FIG. 2C.

According to one embodiment, a system for processing fish is provided with a head cutter apparatus, a tail cutter apparatus, a gutter apparatus, a tail splitter apparatus and a filleter apparatus. These apparatuses may be separate systems or combined with one or more of the other apparatuses to form an integrated system. In some instances, these apparatuses may be portions of a single integrated fish processing system.

According to an example fish processing method, the head, collar and pectoral fins may be removed with a straight cut that is roughly perpendicular to the length of the fish, as illustrated in FIG. 1, using a head cutter apparatus, and the tail may be removed with a perpendicular straight cut, as illustrated in FIG. 1, using a tail cutter apparatus. A gutter apparatus may then be used to open the belly cavity of the fish and to remove the viscera, gonads and kidney without damage to the fish or the viscera. A tail splitter apparatus may then be used to open the ventral side of the tail up to the vertebrae, splitting the tail ventral spines and exposing the bottom of the spine from head to tail. Then a filleter apparatus may be used to separate fillets from a frame of the fish which includes the vertebrae, ribs, spines and pinbones.

Further details of aspects of the fish processing systems and methods will now be described with reference to example apparatuses shown in FIGS. 3 through 13.

Figure 3:
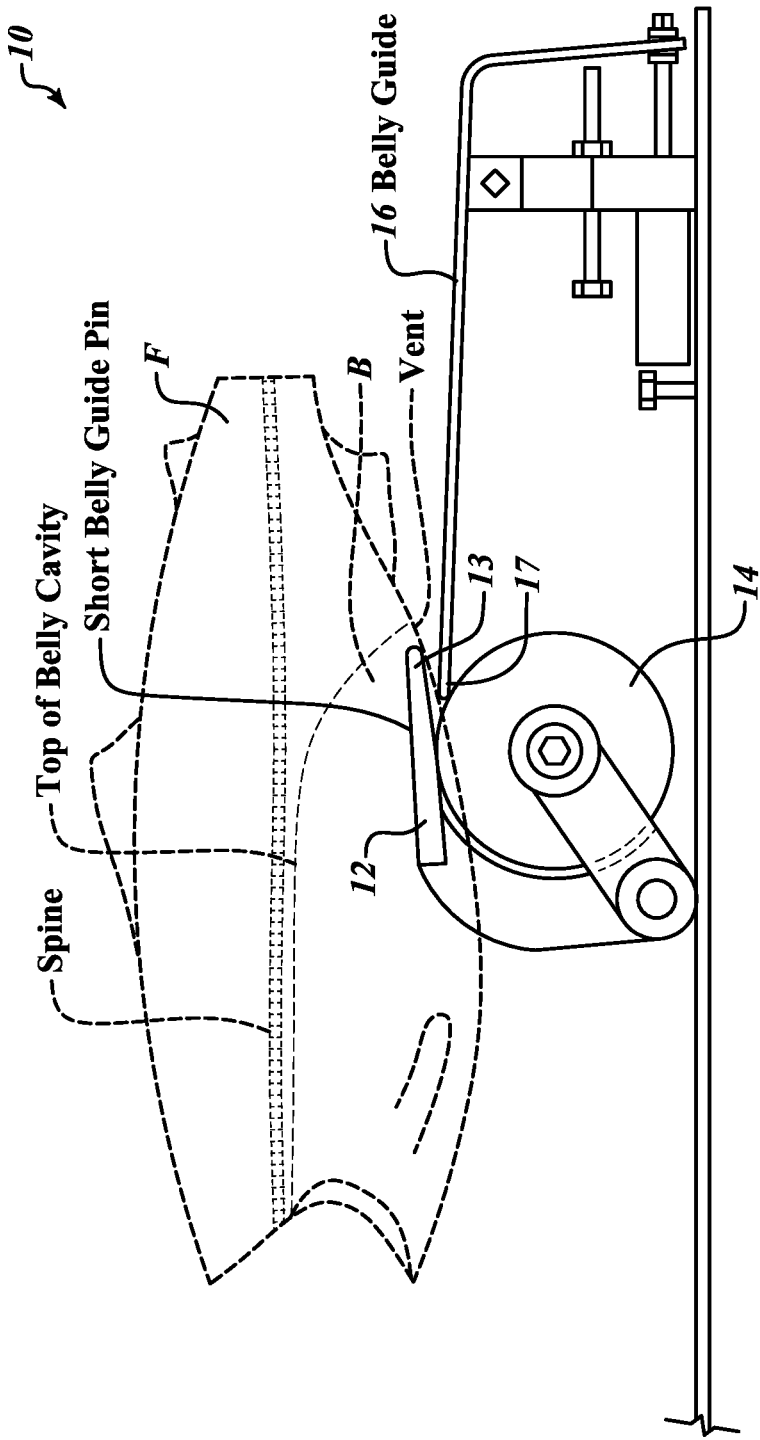
FIG. 3 is a side elevational view of a portion of a fish processing system, according to one embodiment.

With reference to FIG. 3, the gutter apparatus may include a short pin 12 positioned above a round belly knife 14 for cutting the skin open on the bottom center of the tail of the fish F to facilitate subsequent splitting of the tail. In accordance with the example embodiment of the subsystem 10 shown in FIG. 3, a method of processing fish may include transporting the fish F in a headless configuration into engagement with a belly guide pin 12 located above a round belly knife 14 that is oriented vertically to cut along a centerline of the fish F, and passing the fish F over the belly guide pin 12 such that the belly guide pin 12 pierces a rear end of the belly cavity B of the fish F and rides above the skin of the fish below the tail while the round belly knife 14 cuts the skin from below the belly guide pin 12. The skin of the fish F below the tail may pass between an upstream end 13 of the belly guide pin 12 and a downstream end 17 of a belly guide 16 prior to being cut by the round belly knife 14.

Figure 5:
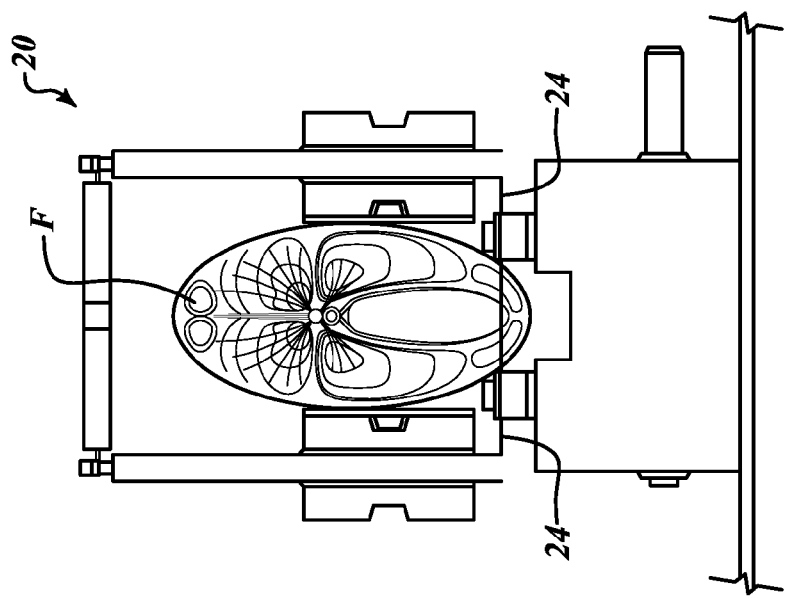
FIG. 5 is a cross-sectional view of the portion of the fish processing system of FIG. 4.
Figure 4:
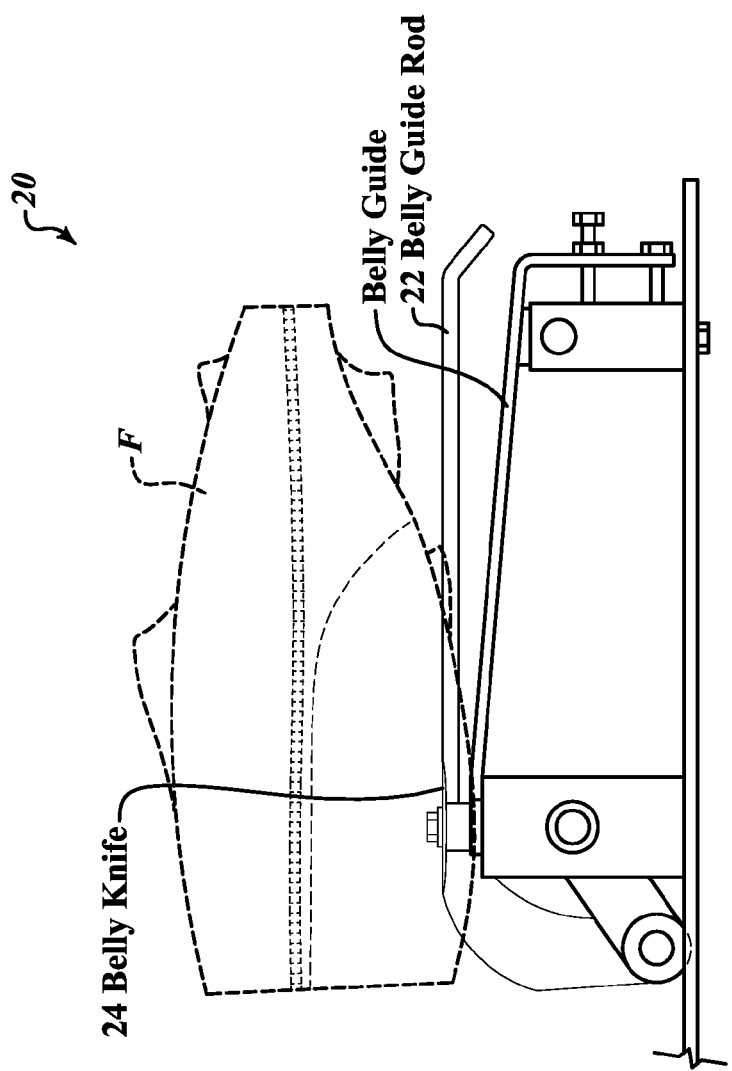
FIG. 4 is a side elevational view of a portion of a fish processing system, according to another embodiment.

With reference to FIGS. 4 and 5, the gutter apparatus 20 may include double horizontal round blades 24 to cut out a narrow section of belly to remove the pelvic and anal fins. In accordance with the example embodiment of the subsystem 20 shown in FIGS. 4 and 5, a method of processing fish may include transporting the fish F in a headless configuration into engagement with a belly guide member 22 located between opposing round knives 24 that are oriented to cut generally perpendicular to a central plane of the fish F, and passing the fish F over the belly guide member 22 while the opposing round belly knives 24 sever a narrow section of the belly of the fish F to remove the pelvic and/or anal fins of the fish F. The belly guide member 22 may comprise an elongated rod that is positioned to enter the head end of the fish F and pass through the fish F as the opposing round belly knives 24 sever the narrow section of the belly of the fish.

Figure 6:
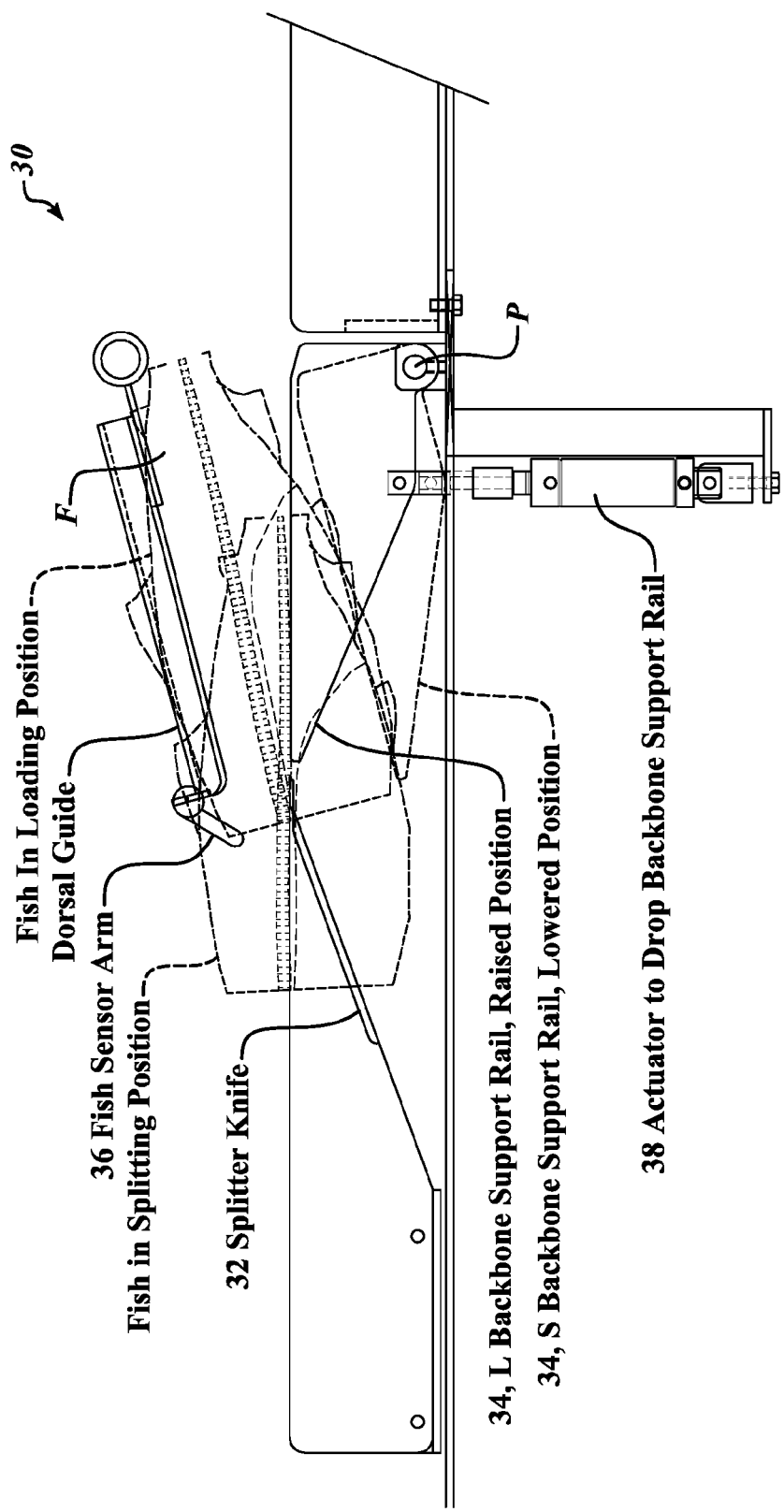
FIG. 6 is a side elevational view of a portion of a fish processing system, according to yet another embodiment.

With reference to FIG. 6, the tail splitter apparatus 30 may include a splitter knife arrangement 32 positioned to open the ventral side of the tail of the fish F up to the vertebrae, splitting the tail ventral spines and exposing the bottom of the spine from head to tail. In accordance with the example embodiment of the subsystem 30 shown in FIG. 6, a method of processing fish may include transporting the fish F belly down in a headless configuration into engagement with a splitter knife arrangement 32 with the assistance of a moveable backbone support device 34, and passing the fish F over the splitter knife arrangement 32 to separate the muscle tissue and ribs through the length of the fish F and to split the tail of the fish F. The method may further include sensing a position of the fish F with a sensor device 36 and actuating the moveable backbone support device 34 from a loading position L to a splitting position S as the fish F is passed over the splitter knife arrangement 32. In some instances, the backbone support device 34 may be moved between the loading position L and the splitting position S by an actuator 38 that is configured to pivot the backbone support device 34 about a pivot axis P.

Figure 7:
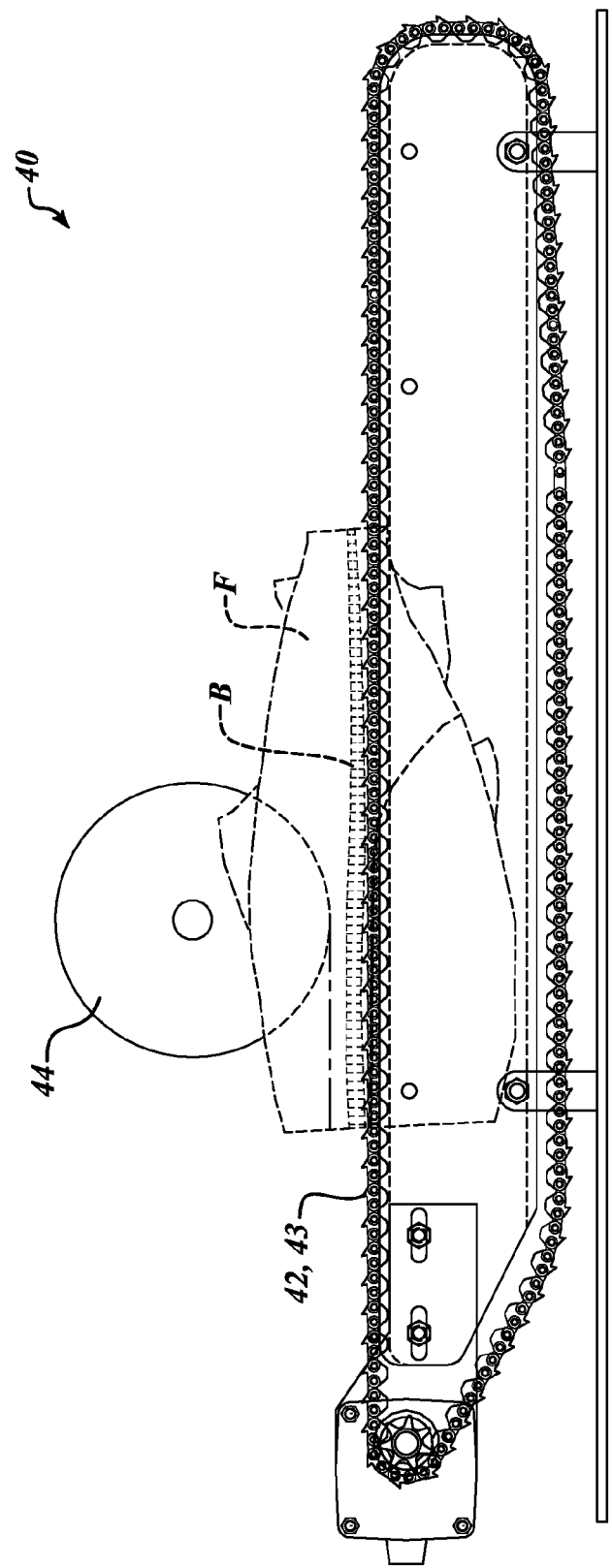
FIG. 7 is a side elevational view of a portion of a fish processing system, according to still yet another embodiment.

With reference to FIGS. 7 and 8, the filleter apparatus may be configured such that fish are mounted on a thin linear support 42 (e.g., a rail, a chain mounted on a rail) with the vertebral column touching the support 42 head to tail. In this manner, the dorsal spines, ribs, and spine-ribs and the tail ventral spines may be held in the same position relative to cutting devices 44 of the filleter apparatus throughout the length of the fish F. The fish F may be transported with opposing conveyor belts engaging the sides of the fish, or with a circulating chain or other traction element. Cutting devices 44 in the form of a pair of round knives may be provided to cut on both sides of the dorsal spines down to a point close to the connection of the pinbones to the vertebrae, but without cutting these pinbones, as illustrated by the cut lines labeled C in FIGS. 2A-2C.

In accordance with the example embodiment of the subsystem 40 shown in FIGS. 7 and 8, a method of processing fish may include exposing a backbone B of a fish F from a belly side of the fish, positioning the backbone B of the fish F on a conveyor device 43, and conveying the fish F with the backbone B in contact with the conveyor device. The conveyor device 43 may include, for example, a spiked chain, and positioning the backbone B of the fish F on the conveyor device 43 may include engaging the backbone B of the fish F with the spiked chain such that the fish F straddles the spiked chain as the fish F is transported. The conveyor device 43 may be configured to support the backbone B along a majority of a length thereof while simultaneously conveying the fish F. In some instances, for example, the conveyor device 43 may be a circulating drive chain having a narrow profile to engage the backbone B of the fish F along a majority of a length thereof. The method may further Include cutting the fish F from the dorsal side on each of opposing sides of a central plane of the fish F to a location adjacent a connection of the pinbones of the fish F with the vertebrae of the fish F while the fish F is conveyed with the backbone in contact with the conveyor device 43.

With reference to FIGS. 9 through 13, the filleter apparatus may further include peeling members 52 located on opposing sides of the spine, which are configured to press tightly to the ribs and ventral spines and peel the fillets off the bones without cutting. The pinbones fold down and are also removed as the peeling members 52 move through the fish F. The peeling members 52 may be fixed, oscillating or may move in a single stroke to remove the fillets from the frame (which includes the spine and pinbones).

Figure 10:
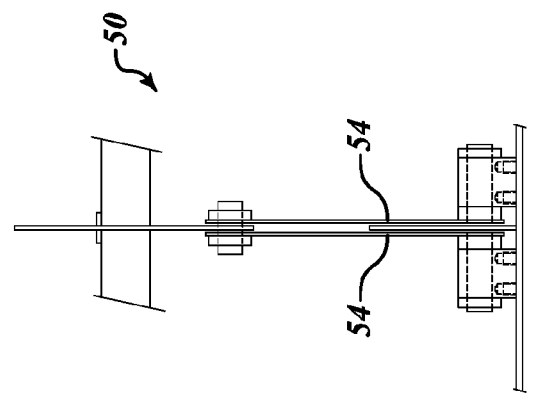
FIG. 10 is an end elevational view of the portion of the fish processing system of FIG. 9.
Figure 9:
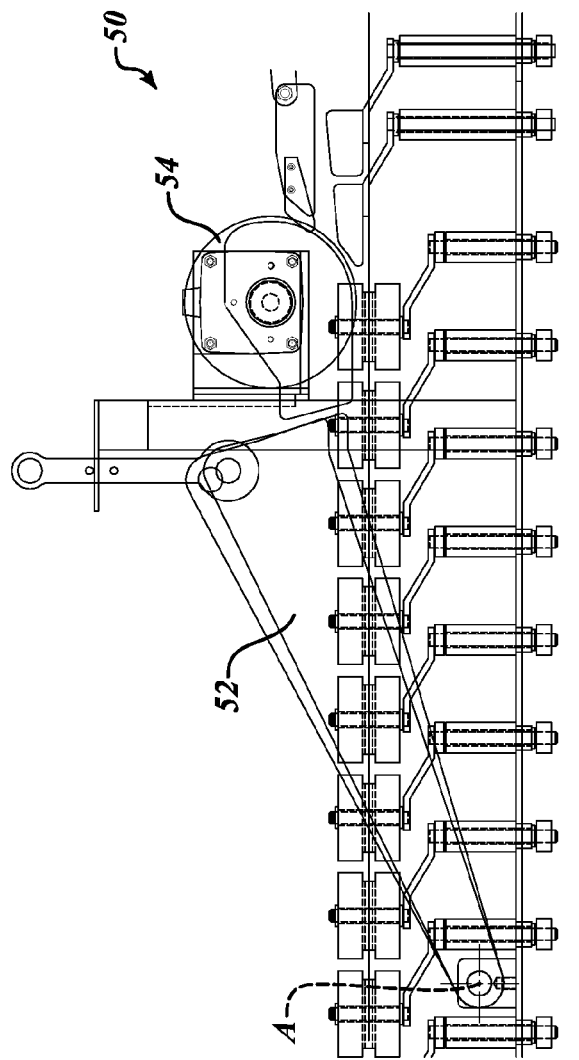
FIG. 9 is a side elevational view of a portion of a fish processing system, according to yet another embodiment.
Figure 11:
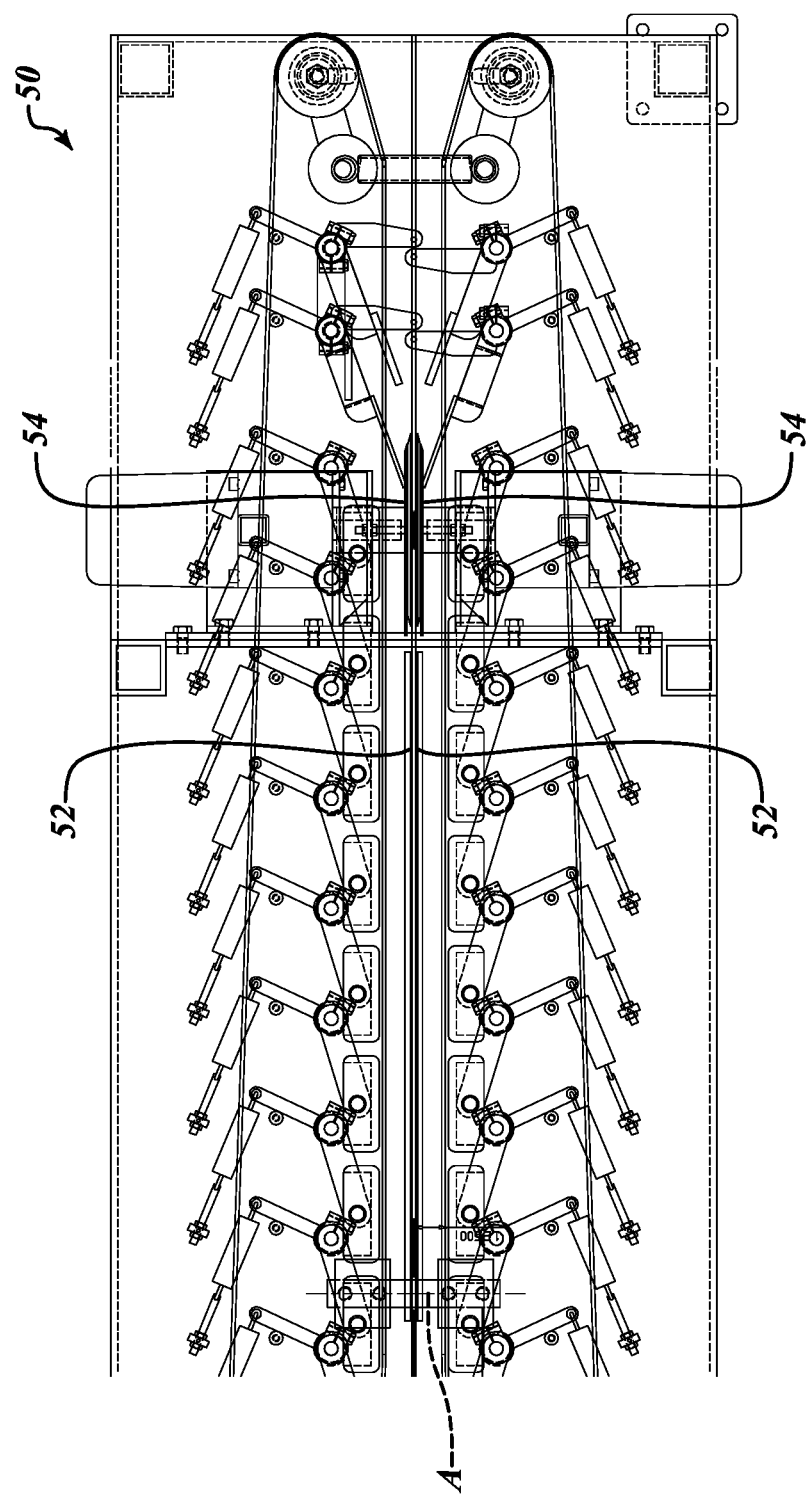
FIG. 11 is a top plan view of the portion of the portion of the fish processing system of FIG. 9.

As shown in the example subsystem 50 of FIGS. 9 through 11, peeling members 52 may be provided in the form of plate-like structures that are pivotably grounded at a downstream end to pivot about an axis A. In this manner, an upstream end of the peeling members 52 may be moved generally vertically as the peeling members 52 swing about the axis A. In some instances, the peeling members 52 may be configured to move downward as each fish F is transported past the peeling members 52 to assist in peeling the fillets from the spine, ribs and pinbones. In other instances, the peeling members 52 may remain static as fish F are transported past peeling members 52, or may oscillate within a set range of motion. As shown, the peeling members 52 may be located immediately downstream of a pair of vertically oriented round blades 54 that may be arranged to cut on both sides of the dorsal spines down to a point close to the connection of the pinbones to the vertebrae, but without cutting the pinbones, as illustrated by the cut lines labeled C in FIGS. 2A-2C. In this manner, the peeling members 52 may located to assist in peeling the fillets from the spine, ribs and pinbones immediately after the dorsal cuts are made. Further details of the example embodiment of the peeling members 52 can be seen in FIGS. 12, 12A and 13, wherein a peeling member 52 for one side of the subsystem 50 is shown in isolation (which may be mirror-image of the peeling member 52 for the other side). As an example, each peeling member 52 may have an edge section 53 that tapers to a point P to assist in peeling the fillets from the spine, ribs and pinbones of the remaining fish structure during fish processing. The edge section 53 may extend along at least a majority of a length of the peeling member 52. The upstream end of the peeling member 52 may be blunt or dull.

In other embodiments, the fillets may be removed from the frame in a conventional fashion with round blades, cutting the pinbones and requiring later removal of the pinbones.

In accordance with one example embodiment having the aforementioned peeling members 52, a method of processing fish may include, after cutting the fish F from the dorsal side on each of opposing sides of the central plane of the fish F, bringing peeling members 52 located on opposing sides of the central plane into contact with the ribs and ventral spines of the fish F; and peeling the fillets of the fish F from the ribs and ventral spines with the assistance of the peeling members 52. Peeling the fillets of the fish F from the ribs and ventral spines with the assistance of the peeling members 52 may include simultaneously removing pinbones of the fish F from the fillets. As such, the pinbones of the fish F may be removed during filleting, without aging of the fish, by leaving the pinbones attached to the backbone and separating the pinbones and backbone together from the fillets.

Although aspects of the fish processing systems and methods described herein are discussed in the context of filleting fish in a particularly efficient and reliable manner, it is appreciated that aspects may be applied to a wide range of fish processing systems, subsystems and other devices beyond filleting machines and related filleting methods. Still further, although the fish processing systems and methods described herein are discussed in the context of filleting salmon or otherwise preparing salmon for filleting, it will be apparent to those of ordinary skill in the art that aspects of the various embodiments described herein may be used or adapted for processing a wide variety of different fish.

Moreover, aspects and features of the various embodiments described above may be combined to provide further embodiments, and may be combined with other features of known filleting machines, such as, for example, those shown and described in U.S. Pat. Nos. 3,309,730; 5,520,576 and 6,994,617. All of the above US patents and the US provisional patent application referred to in the Application Data Sheet, namely, U.S. Provisional Patent Application No. 62/316,255, filed Mar. 31, 2016, are incorporated herein by reference, in their entirety. Aspects of the embodiments can be modified, if necessary, to employ systems, concepts and features of the various patents and provisional application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of operation of a fish processing system to cut the skin of a fish below the tail, the method comprising:
    transporting the fish in a headless configuration into engagement with a belly guide pin located above a round belly knife that is oriented vertically to cut along a centerline of the fish; and
    passing the fish over the belly guide pin such that the belly guide pin pierces a rear end of the belly cavity of the fish and rides above the skin of the fish below the tail while the round belly knife cuts the skin from below the belly guide pin.

2. The method of claim 1 wherein the skin of the fish below the tail passes between an upstream end of the belly guide pin and a downstream end of a belly guide prior to being cut by the round belly knife.

3. A method of operation of a fish processing system to remove the pelvic and/or anal fins of a fish, the method comprising:
    transporting the fish in a headless configuration into engagement with a belly guide member located between opposing round knives that are oriented to cut generally perpendicular to a central plane of the fish; and
    passing the fish over the belly guide member while the opposing round belly knives sever a narrow section of the belly of the fish to remove the pelvic and/or anal fins of the fish.

4. The method of claim 3 wherein the belly guide member comprises an elongated rod that is positioned to enter the head end of the fish and pass through the fish as the opposing round belly knives sever the narrow section of the belly of the fish.

5. A method of operation of a fish processing system to split the tail of a fish, the method comprising:
    transporting the fish belly down in a headless configuration into engagement with a splitter knife arrangement with the assistance of a moveable backbone support device; and
    passing the fish over the splitter knife arrangement to separate the muscle tissue and ribs through the length of the fish and to split the tail of the fish.

6. The method of claim 5, further comprising:
    sensing a position of the fish; and
    actuating the moveable backbone support device from a loading position to a splitting position as the fish is passed over the splitter knife arrangement.

7. A method of operation of a fish processing system, the method comprising:
    exposing a backbone of a fish from a belly side of the fish;
    positioning the backbone of the fish on a conveyor device; and
    conveying the fish with the backbone in contact with the conveyor device.

8. The method of claim 7 wherein the conveyor device is a spiked chain, and wherein positioning the backbone of the fish on the conveyor device includes engaging the backbone of the fish with the spiked chain such that the fish straddles the spiked chain as the fish is transported.

9. The method of claim 7 wherein the conveyor device is configured to support the backbone along a majority of a length thereof while simultaneously conveying the fish.

10. The method of claim 7 wherein the conveyor device is a circulating drive chain having a narrow profile to engage the backbone of the fish along a majority of a length thereof.

11. The method of claim 7, further comprising:
    cutting the fish from the dorsal side on each of opposing sides of a central plane of the fish to a location adjacent a connection of the pinbones of the fish with the vertebrae of the fish while the fish is conveyed with the backbone in contact with the conveyor device.

12. The method of claim 11, further comprising:
    after cutting the fish from the dorsal side on each of opposing sides of the central plane of the fish, bringing peeling members located on opposing sides of the central plane into contact with the ribs and ventral spines of the fish; and
    peeling the ribs and ventral spines from fillets of the fish with the assistance of the peeling members.

13. The method of claim 12 wherein peeling the ribs and ventral spines from the fillets of the fish with the assistance of the peeling members includes simultaneously removing pinbones of the fish from the fillets.

14. A method of operation of a fish processing system, the method comprising:
    bringing peeling members located on opposing sides of a central plane of the fish into contact with the ribs and ventral spines of the fish; and
    peeling the ribs and ventral spines from fillets of the fish with the assistance of the peeling members.

15. The method of claim 14 wherein peeling the ribs and ventral spines from the fillets of the fish with the assistance of the peeling members includes simultaneously removing pinbones of the fish from the fillets.

16. A method of operation of a fish processing system, the method comprising:
    removing pinbones from fillets of the fish during filleting of the fish, without aging of the fish, by leaving the pinbones attached to the backbone and peeling the pinbones out of the fillets together with the backbone.

\* \* \* \* \*